(12) United States Patent
Holste et al.

(10) Patent No.: US 6,972,120 B2
(45) Date of Patent: Dec. 6, 2005

(54) METHOD OF REMOVING MERCURY FROM FLUE GASES

(75) Inventors: Reinhard Holste, Gummersbach (DE); Wolfgang Fey, Wiehl (DE)

(73) Assignee: FISIA Deutschland GmbH, (DE)

( * ) Notice: Subject to any disclaimer, the term of this patent is extended or adjusted under 35 U.S.C. 154(b) by 0 days.

(21) Appl. No.: 10/058,541

(22) Filed: Jan. 28, 2002

(65) Prior Publication Data

US 2002/0114750 A1    Aug. 22, 2002

(30) Foreign Application Priority Data

Feb. 16, 2001  (DE) ............................... 101 07 761

(51) Int. Cl.[7] ............................................. B01D 53/64
(52) U.S. Cl. ................... 423/210; 423/566.1; 588/313
(58) Field of Search ............................... 423/210, 107, 423/566.1; 588/242, 246, 313

(56) References Cited

U.S. PATENT DOCUMENTS

| | | | | |
|---|---|---|---|---|
| 4,044,098 A | * | 8/1977 | Miller et al. ................. | 423/210 |
| 4,138,231 A | * | 2/1979 | Hedenas et al. ............... | 95/196 |
| 4,233,274 A | * | 11/1980 | Allgulin ..................... | 423/210 |
| 4,364,915 A | * | 12/1982 | Proctor ..................... | 423/437.1 |
| 4,863,489 A | * | 9/1989 | Suggitt ....................... | 48/197 R |
| 4,985,137 A | * | 1/1991 | Audeh ..................... | 208/251 H |
| 6,214,304 B1 | * | 4/2001 | Rosenthal et al. .......... | 423/210 |
| 6,284,199 B1 | * | 9/2001 | Downs et al. .............. | 422/168 |
| 6,503,470 B1 | * | 1/2003 | Nolan et al. ................ | 423/210 |
| 2002/0068030 A1 | * | 6/2002 | Nolan et al. ................ | 423/210 |

FOREIGN PATENT DOCUMENTS

| | | | |
|---|---|---|---|
| DE | 41 23 907 | 1/1993 | |
| EP | 0 669 854 | 9/1995 | |
| EP | 0 709 128 | 5/1996 | |
| FR | 2644359 A2 | * 9/1990 | .......... B01D 53/36 |

* cited by examiner

Primary Examiner—Stanley S. Silverman
Assistant Examiner—Peter J. Lish
(74) Attorney, Agent, or Firm—Robert W Becker & Associates; Robert W Becker

(57) ABSTRACT

A method of removing metallic mercury and ionic mercury from flue gases, especially of a power plant, is provided. A gas that contains sulfur dioxide, or other adequate amounts of sulfur in the form of $H_2S$ or COS, and a gas that contains hydrogen, are conveyed to a catalyzer for producing a gas that contains elemental sulfur and hydrogen sulfide. This gas is conveyed to flue gas upstream of a separator, wherein mercury in the flue gas reacts with the sulfur and ionic sulfur in the gas and is separated out in the separator.

12 Claims, 2 Drawing Sheets

METHOD OF REMOVING MERCURY FROM FLUE GASES

BACKGROUND OF THE INVENTION

The present invention relates to a method of removing metallic mercury ($Hg^0$) and ionic mercury ($Hg^{+2}$) from flue gases, especially of a power plant, whereby the mercury reacts with elemental sulfur ($S^0$) and ionic sulfur ($S^{-2}$) and is separated off in a separator.

From EP 0 709 128 A2 it is known to remove metallic mercury and ionic mercury with the aid of elemental sulfur and hydrogen sulfite by introducing into the flue gas a sodium polysulfide, especially sodium tetrasulfide ($Na_2S_4$). This method is utilized in refuse incinerators.

There is also a need for reducing the mercury concentration in the large flue gas streams of power plant flue gases. For this purpose, the use of a sodium polysulfide and/or a potassium polysulfide and/or an ammonium polysulfide (see DE 41 23 907 A1) is less suitable, since this represents an additional and expensive operating measure for the power plant.

It is therefore an object of the present invention to provide a method with which it is possible to reduce the mercury concentration in a more straightforward and economical manner.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
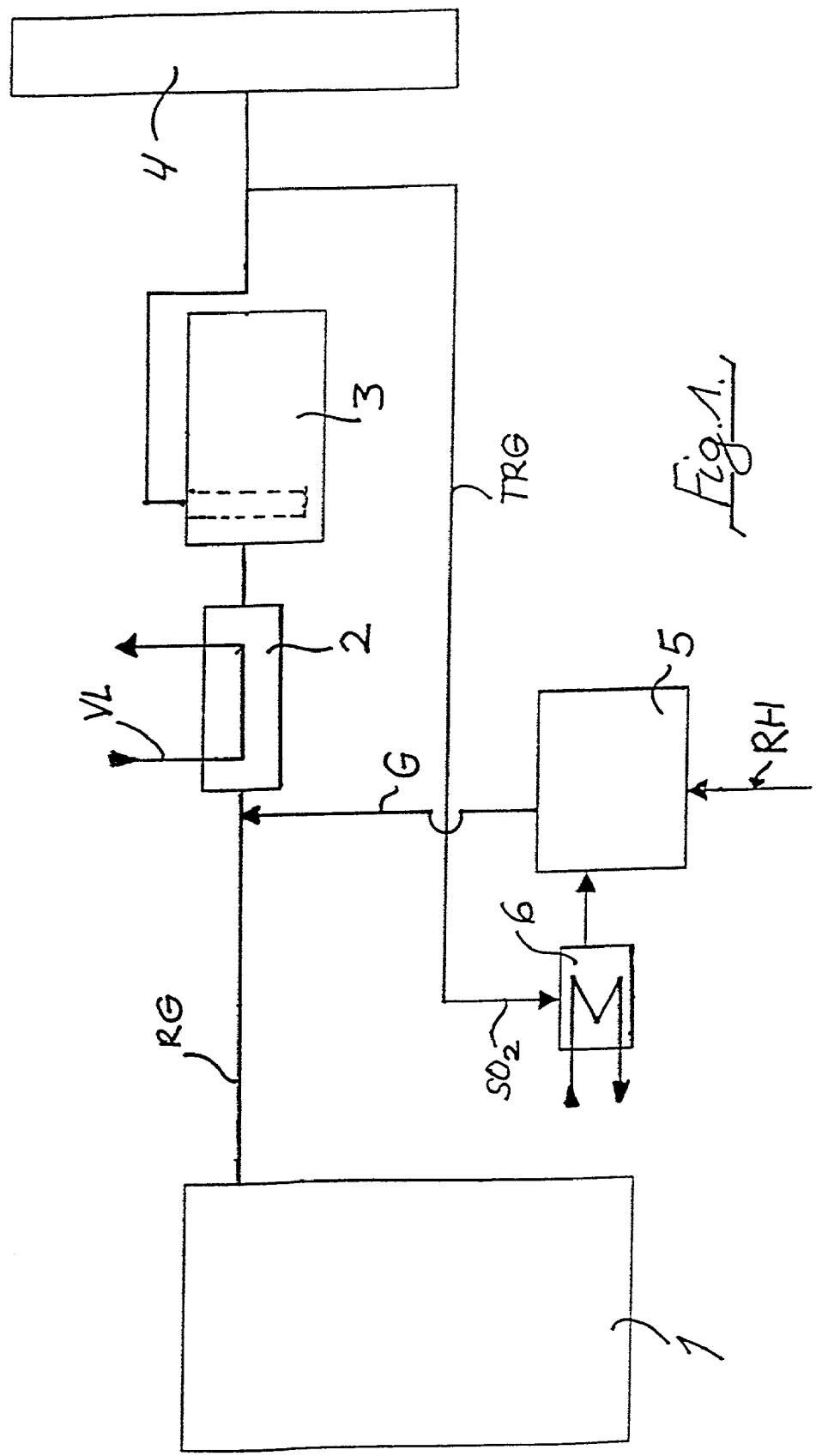
FIG. 1 shows a first exemplary embodiment of the present invention, according to which as a gas that contains sulfur dioxide a partial stream of the flue gas itself is utilized.

The method of the present invention is characterized primarily in that a gas that contains sulfur dioxide, and a gas that contains hydrogen, are conveyed to a catalyzer for producing a gas that contains elemental sulfur and hydrogen sulfide; this gas is conveyed to the flue gas upstream of the separator.

The reaction at the catalyzer takes place according to the following simplified chemistry:

$$2SO_2 + 5H_2 \Rightarrow S^0 + H_2S + 4H_2O. \tag{1}$$

The reduction of the ionic mercury and of the elemental mercury with the resulting sulfur components takes place according to the reactions (2) and (3).

$$Hg^{2+} + S^{2-} \Rightarrow HgS\downarrow \tag{2}$$

$$Hg^0 + S^0 \Rightarrow HgS\downarrow \tag{3}$$

Suitable catalyzers are known, for example, from EP 0 669 854 B1, with this document being incorporated herein by this reference thereto. Such catalyzers contain pure compounds or mixtures thereof selected, for example, from the group containing silicates, aluminum oxide, zinc ferrite and titanates, or metals of the group IV and/or VIII of the periodic table, on suitable carrier material. Particularly suitable is a Co/Mo catalyzer, which is known from the Claus process, where a conversion from gas that contains $H_2S$ to elemental sulfur is effected. With the catalyzer, the yield of the components that are formed, namely sulfur and hydrogen sulfide, are to be maintained from the concentrations of the $SO_2$ containing gas and/or from the hydrogen that is added and/or specific temperatures.

The gas that contains sulfur dioxide is preferably a gas selected from the group: sulfur dioxide from a supply of $SO_2$, a gas containing sulfur dioxide from the combustion of elemental sulfur or the thermal treatment of sulfur-containing material, such as the roasting of pyrite and/or a partial stream of the flue gas itself.

By using a partial stream of the flue gas, an operating agent that is already available in a power plant and is therefore free-of-charge is utilized. As a hydrogen-containing gas (reducing agent) a gas is selected from the group: hydrogen, natural gas and/or synthesis gas from the gasification of coal. The hydrogen can be produced, for example, by the decomposition of water.

If a gas that contains dust and sulfur dioxide, for example the flue gas of the power plant itself, and/or a gas that contains dust and hydrogen, are utilized, there is effected a removal of dust prior to supplying the gas to the catalyzer, so that the catalyzer is not subjected to mechanical and/or chemical wear.

In order to achieve the temperature required for the catalysis, preferably a temperature between 150 and 300° C., at least one of the gases that is supplied to the catalyzer is heated up or cooled off. The temperature of the catalyzer also determines the ratio of the sulfur resulting during the catalysis to the resulting hydrogen sulfide. This means that by a suitable selection of the temperature, the two sulfur components can be optimally adapted to the actual mercury concentrations of the ionic and/or metallic mercury.

It can also be expedient to heat up or cool off the gas that exits the catalyzer to a temperature that is suitable for mixing with the flue gas, and hence for the bonding of mercury; such a suitable temperature is preferably between 50 and 300° C.

The heating up or cooling off of the gas or gases is preferably effected by means of a gas/gas heat exchanger.

If air for combustion for the power plant is heated up in an air preheater by the flue gas, the mercury content of which is to be reduced, the gas coming from the catalyzer is supplied to the air preheater either upstream or downstream thereof, whereby the temperature of the gas is set to a temperature that is suitable for the mercury reduction.

As in EP 709 128 A2, the separator can be embodied as a layerforming dust filter (fibrous filter). However, it is also conceivable to use an electrostatic filter a spray dryer, or an absorption scrubber as a separator.

Further specific features of the present invention will be described in detail subsequently.

DESCRIPTION OF PREFERRED EMBODIMENTS

The flue gases RG exiting from a block or unit 1 representing a power plant are guided across an air preheater 2 that serves for preheating air for combustion VL. The gas is subsequently guided across a separator 3 in the form of a fibrous filter and is then discharged into the atmosphere via a chimney 4. For the sake of simplicity, other measures that might be undertaken for desulfurization and/or reduction of $NO_x$ levels are not illustrated in the drawing.

A catalyzer or catalytic converter 5 is provided for the provision of a gas G that contains $H_2S/S$; this catalyzer is preferably a Co/Mo catalyzer from the company Akzo Nobel, of the Netherlands.

Supplied to the catalyzer 5, as a gas that contains $SO_2$, is a partial stream TRG of the flue gas that is withdrawn downstream of the fibrous filter 3 and that is heated up in such a way in a gas/gas heat exchanger 6 disposed upstream of the catalyzer 5 that the temperature of, for example, 205° C. required for the catalysis is achieved. As the hydrogen-containing reduction gas RH, hydrogen ($H_2$) is supplied, so that the reaction can take place in the catalyzer 5 pursuant to the equation (1).

The gas G that contains $H_2S/S$ and that exits the catalyzer 5 is supplied to the flue gas RG prior to the air preheater 2.

Figure 2:
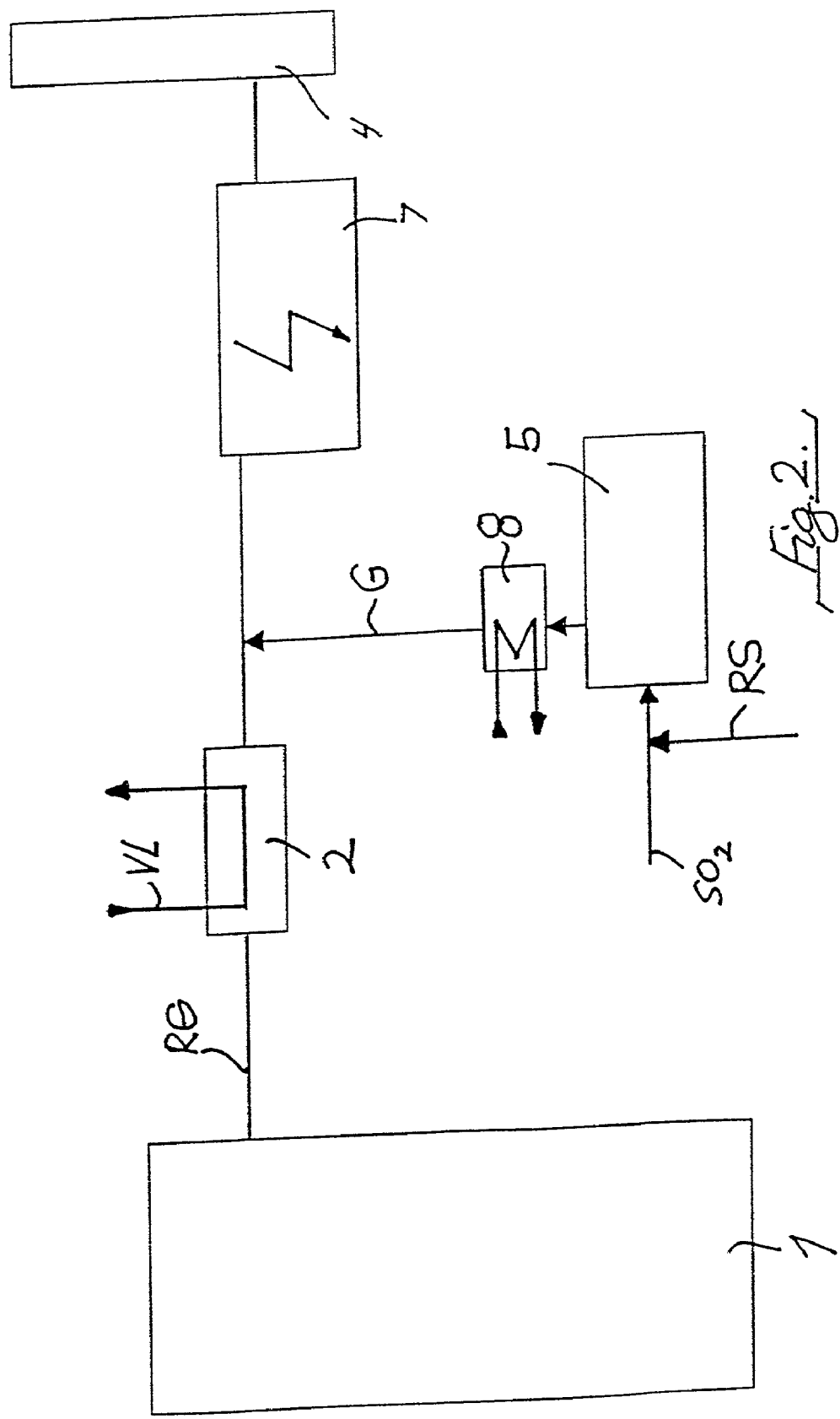
FIG. 2 shows a further exemplary embodiment of the present invention, according to which an external source of sulfur dioxide gas is used.

In the embodiment illustrated in FIG. 2, in place of the fibrous filter an electrostatic filter 7 is utilized as the separator. Sulfur dioxide $SO_2$ is supplied to the catalyzer 5 from an external source.

As the reduction gas RS, synthesis gas is supplied that has an adequate content of hydrogen in the form of $H_2$ or $CH_4$, with this reduction gas being mixed with the $SO_2$ upstream of the catalyzer 5 (it should be noted that such a premixing is, of course, also possible with the embodiment of FIG. 1).

In the event that the synthesis gas itself contains an adequate amount of sulfur, for example in the form of $H_2S$ and/or COS, it would be conceivable that the supply of a gas containing sulfur dioxide is not necessarily required; rather, a gas containing $H_2S/S$ is produced in the catalyzer 5 from the substituents of the synthesis gas itself.

It is presumed that the $SO_2$ and the reduction gas have temperatures that are adequate for the catalysis temperature. However, if necessary, a heat exchanger can also be provided for one or both of the gases, or for the mixture. With the embodiment illustrated in FIG. 2, a gas/gas heat exchanger 8 is disposed downstream of the catalyzer 5 to raise or lower the temperature of the gas G to a temperature that is favorable for the reactions of the equations (2) and (3), since with the embodiment of FIG. 2, the gas is mixed with flue gas RG downstream of the air preheater 2, i.e. to a colder flue gas. If necessary, such a heat exchanger 8 as is disposed downstream of the catalyzer 5 can also be provided for the embodiment of FIG. 1.

The specification incorporates by reference the disclosure of German priority document DE 101 07 761.0 of Feb. 16, 2001.

The present invention is, of course, in no way restricted to the specific disclosure of the specification and drawings, but also encompasses any modifications within the scope of the appended claims.

We claim:

1. A method of removing metallic mercury and ionic mercury from flue gases, said method including steps of:
   combusting a combustible composition as a consequence of which flue gases comprising both metallic mercury and ionic mercury are created;
   flowing said flue gases along a flow path such that said flue gases flow past a location upstream of a separator, through said separator, and then past a location downstream of said separator;
   at said location downstream of said separator, diverting a partial stream of said flue gas that contains sulfur dioxide or other adequate amounts of sulfur in the form of $H_2S$ or COS and conducting said partial stream of said flue gas to a catalyzer;
   conveying a gas that contains hydrogen to said catalyzer whereat the sulfur dioxide or other adequate amounts of sulfur in the form of $H_2S$ or COS in said partial stream of said flue gas conducted to said catalyzer reacts with hydrogen to produce a gas G that contains elemental sulfur and hydrogen sulfide; and
   conveying said gas G containing elemental sulfur and hydrogen sulfide to said location upstream of said separator for contact with said flue gas thereat, wherein metallic mercury and ionic mercury in said flue gas react, respectively, with elemental sulfur and hydrogen sulfide in said gas G and are separated out in said separator as said flue gases thereafter flow through said separator.

2. A method according to claim 1, wherein said gas that contains sulfur dioxide is selected from at least one of the group consisting of sulfur dioxide from a supply of $SO_2$, a sulfur dioxide containing gas from the combustion of elemental sulfur or from the thermal treatment of sulfur-containing material, and a partial stream of said flue gas.

3. A method according to claim 2, wherein said thermal treatment of sulfur-containing material comprises the roasting of pyrite.

4. A method according to claim 1, wherein said gas that contains other adequate amounts of sulfur is at least a synthesis gas from coal gasification.

5. A method according to claim 1, wherein said gas that contains hydrogen is at least one of a gas selected from the group consisting of hydrogen, natural gas and synthesis gas from gasification of coal.

6. A method according to claim 1, wherein in the event that at least one of said gases that contain sulfur dioxide or hydrogen also contains dust, said gas is subjected to a removal of dust prior to conveying said gas to said catalyzer.

7. A method according to claim 1, wherein at least one of said gases that is conveyed to said catalyzer is heated up or cooled off.

8. A method according to claim 1, wherein said gas that is produced in said catalyzer is heated up or cooled off to a temperature that is suitable for a mixing of said gas with said flue gas.

9. A method according to claim 7, wherein said heating up or cooling off is effected via a gas/gas heat exchanger.

10. A method according to claim 8, wherein said heating up or cooling off is effected via a gas/gas heat exchanger.

11. A method according to claim 1, wherein air for combustion for a power plant is heated up by said flue gas in an air preheater, and wherein said gas produced in said catalyzer is conveyed to said flue gas upstream or downstream of said air preheater.

12. A method according to claim 1, wherein said separator is selected from the group consisting of electrostatic filters, fibrous filters, spray dryers and absorption scrubbers.

* * * * *